Feb. 20, 1962     M. S. WILLIAMS, JR., ET AL     3,022,409
ELECTRIC RANGE WITH MECHANICAL INTERLOCK SYSTEM
Filed July 25, 1960     2 Sheets-Sheet 1
FIG. 2
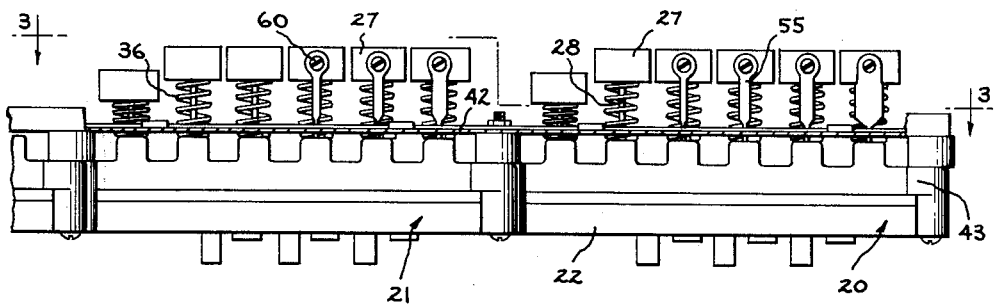
FIG. 3
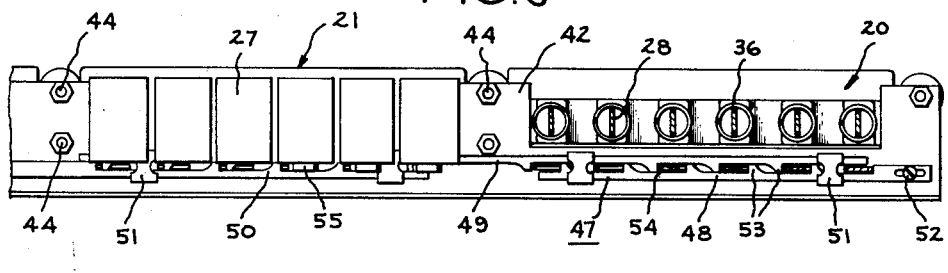
FIG. 4
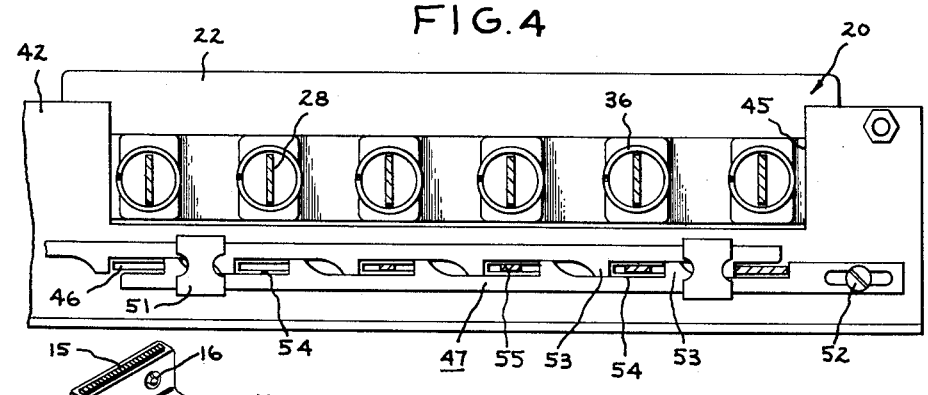
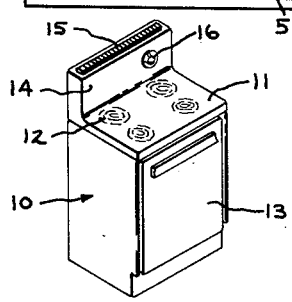
FIG. 1
INVENTORS
MILTON S. WILLIAMS JR.
GEORGE A. SCOTT
BY
Richard L. Caslin
THEIR ATTORNEY

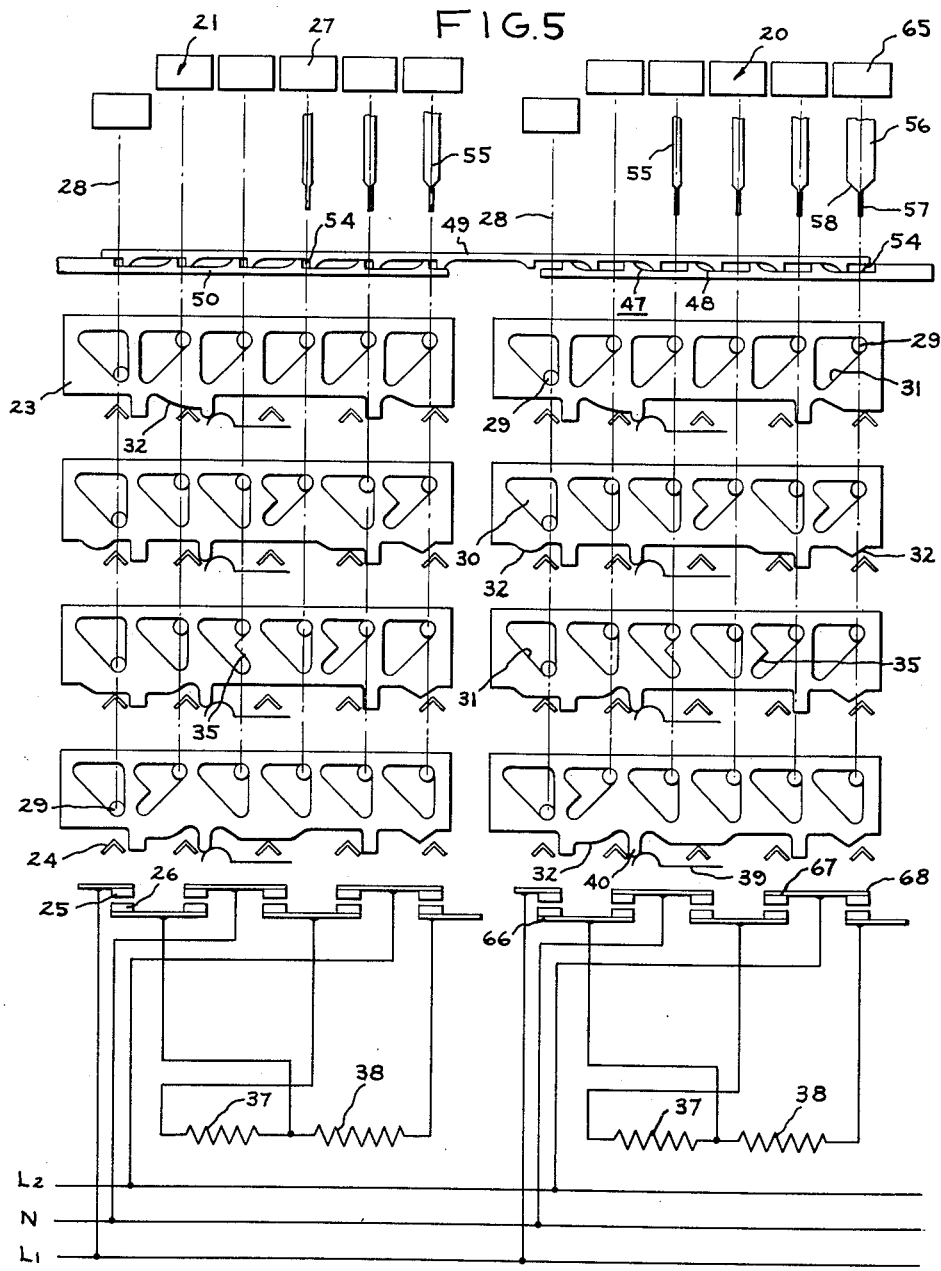

United States Patent Office 3,022,409
Patented Feb. 20, 1962

3,022,409
ELECTRIC RANGE WITH MECHANICAL INTERLOCK SYSTEM
Milton S. Williams, Jr., Middletown, and George A. Scott, Jeffersontown, Ky., assignors to General Electric Company, a corporation of New York
Filed July 25, 1960, Ser. No. 45,192
14 Claims. (Cl. 219—20)

The present invention relates to an electric range and particularly to a mechanical switch interlocking system to limit the total current for a range to a predetermined maximum amount; while not limited thereto this invention is particularly adapted for a range intended to operate on a 120-volt, 20 ampere circuit. Electric ranges now found on the market generally operate on a 240-volt, 60 ampere circuit. In many metropolitan areas of this country there are old homes and multi-storied apartment buildings with inadequate wiring and it is either virtually impossible to supply them with standard 240-volt ranges, or at the best very expensive to do so. In such homes and apartments the fuel for heating the premises is either oil, gas or coal, and the electric service of 120-volt, 60 amperes or more merely provides for the lighting circuits, a few small appliances and a few major appliances such as an automatic clothes washer and a refrigerator.

Another factor which is increasing in importance is that large house trailers or mobile homes have multiplied in huge numbers in recent years so that the dollar volume of ranges designed specifically for this market has reached major proportions. While trailer parks generally have a 120-volt electric service very few have a 240-volt service.

The principal object of the present invention therefore is to design an electric range with a mechanical interlock system between the control switches of the range to limit the total amount of current drawn by the range by restricting the wattage combinations drawn by the several surface heating elements and oven units of the range at any one time, thus adapting the range to a 120 voltage source.

A further object of the present invention is to provide an electric range with a mechanical interlock system between a plurality of multiple pushbutton switches to limit the amount of wattage used by the range, where there is a definite relationship between the wattage rating of certain circuits controlled by the pushbuttons of the switches and the widths of plungers that are associated with such pushbuttons for registering the wattage in an accumulator device that totals the wattage as it is switched into or out of the circuit.

A further object of the present invention is to provide a mechanical interlock system between a plurality of multiple switches to limit the amount of wattage drawn by the electrical load that is controlled by the switches.

A still further object of the present invention is to provide a mechanical interlock system between a plurality of multiple switches to limit the amount of wattage drawn, where the interlock system includes a sensing means that will not permit the contacts of the switch to be opened or closed if there is no wattage left available for use.

The present invention as applied to an electric range having three surface heating elements and an oven with a lower bake heating element and an upper broil heating element is provided with four multiple pushbutton switches for controlling these various heating elements. Three of the pushbutton switches control the three surface heating elements while the fourth switch has enough positions to control both the bake and broil unit as well as a time bake operation. It should be understood that this invention could equally as well be used to control a drop-in cooktop having the four conventional surface heating units. In order to avoid overloading the circuit, a mechanical interlock system is combined with the switches. The mechanical interlock system includes a group of interconnected slides. Some of the pushbuttons of each switch include a plunger which is adapted to be forced through the slides for moving the slides into an extended position. The width of each plunger is proportional to the wattage of the circuit controlled by its associated pushbutton.

Hence, when a given pushbutton is depressed, the plunger carried thereby will be inserted through the slides. Then as successive buttons are depressed, additional plungers will move through the slides thereby increasing the overall length of the slides until they strike stop members which prevent further extension. When this point is reached, no additional plungers of any of the switches which would add wattage to the total load may be moved into the slides. The mechanical interlock system acts as an accumulator or totalizer which adds up the wattages being carried by the various circuits of the range and limits the available wattage to a predetermined maximum so that the range may be supplied from a 120-volt 20 ampere circuit. Later it is possible to decrease the load by depressing other buttons having narrower plungers without first de-energizing the circuit by pressing an Off button.

Our invention will be better understood from the following description taken in connection with the accompanying drawings and its scope will be pointed out in the appended claims.

FIGURE 1 is a perspective view of a single oven free-standing range embodying the present invention;

FIGURE 2 is a fragmentary elevational view partly in cross-section showing a pair of multiple pushbutton switches that are provided with a mechanical interlock system of the present invention;

FIGURE 3 is a top plan view partly in cross-section of the two switches of FIGURE 2 taken on the line 3—3 of FIGURE 2;

FIGURE 4 is an enlarged plan view partly in cross-section of the multiple pushbutton switch at the right side of FIGURE 3 giving a better understanding of the nature of the interconnected slides that constitute the mechanical interlock system;

FIGURE 5 is a schematic drawing for two switches showing the interconnected slides and the related plungers of the interlock system as well as the configurations of the several sliders of the switch mechanisms with relation to the movable contact blades and the circuit diagrams for two of the three surface heating elements.

Referring in detail to the drawing and in particular to FIGURE 1, this invention has been shown in one form as applied to an electric range 10 having a cooktop 11 with three surface heating elements 12. Under the cooktop 11 is a single oven having a front opening drop door 13. This oven is standard in that it has a lower bake heating element (not shown) and an upper broil heating element (not shown) as is well understood in this art. The back edge of the cooktop 11 includes a backsplasher 14 in which four multiple pushbutton switches 15 are mounted. This invention is directly concerned with the design of a mechanical interlock system for the control switches 15 which will be discussed in greater detail hereinafter. Backsplasher 14 also includes a thermostatic control device 16 for governing the temperature within the oven cavity. Also it might be desirable to have other control devices in the backsplasher such as fuses or circuit breakers as well as fluorescent light controls and clock timer devices but they are neither illustrated nor discussed here because they do not form part of the present invention.

The four control switches 15 are arranged in a row in the backsplasher of the range as shown in FIGURE 1. All four switches are multiple pushbutton switches of the general type shown in the Andrews Patent 2,431,904 dated December 2, 1947, and which is assigned to the same assignee as is the present invention. Three of these switches control the three surface heating elements 12, while the fourth switch controls both the lower bake unit and the upper broil unit either individually or in combination.

Now turning to a consideration of the detail views of FIGURES 2 and 3, it will be understood that each control switch 15 has an Off position and five different On or heat positions although other size switches could be used. Only the two right hand switches are illustrated in FIGURE 2 for the sake of simplicity, but it should be recognized that in the specific range shown there are four such switches in all. The principle of this invention is incorporated with all switches and therefore the description of the interrelation of the interlock system with only two of the switches should suffice to explain the operation of the total number of switches. For purposes of this explanation the right hand endmost switch is identified as switch 20 while the adjacent switch to the left of it is identified as switch 21. Each multiple pushbutton switch includes a hollow insulating base or housing 22 which encloses the switch mechanism that is illustrated in FIGURE 5 as four multiple sliders 23 and movable contact blades 24 that are normally biased closed. Each blade 24 has a contact 25 (FIGURE 5) mounted on its free end for making engageemnt with a fixed contact 26. Both switches 20 and 21 have the identical switch mechanism; namely, four sliders 23 and electrical contacts 25 and 26 as is best seen in FIGURE 5. For illustration purposes the sliders 23 are shown one above the other, but when assembled in the switch housing 22 they are stacked together in rubbing side-by-side relationship.

Each switch has a plurality of pushbuttons 27 that are each assembled on a push rod 28 which extends into the switch housing 22. As illustrated in FIGURE 5, the innermost end of each push rod includes a transverse pin member 29 that extends through aligned openings 30 in a stack of the sliders 23 that are placed side-by-side. Each opening 30 has at least one inclined surface such as 31. Hence as a pushbutton is depressed, the pin 29 will move downwardly and, if the inclined surface 31 is in its path of movement, the slider 23 will be shifted to one side. The reason for shifting the sliders is that one of the longitudinal edges of each slider includes a plurality of cam surfaces 32 of various shapes for forcing the movable contacts 24 into a circuit-opening position against their bias. Accordingly, as each pushbutton is depressed one or more of the four sliders 23 will be shifted either to or fro within the switch housing for either opening or allowing to close the various circuit contacts. A detent spring 39 is positioned in the switch housing for engaging a projection 40 on each of the sliders 23 so as to give the sliders a snap action as they shift back and forth.

Attention is called to the fact that most of the sliders include a special opening 30 that has a second inclined surface 35 at the mid-height of the opening which forms a latching projection to hold the push rod in its depressed position. This is necessary because each pushbutton is provided with a coil spring 36 centered around the push rod 28 as is best seen in FIGURE 2 for normally biasing the pushbutton into its uppermost position. Hence without the locking projection 35 it would not be possible to retain the pushbutton in its depressed position against the action of its spring. Moreover, the inclined surfaces 31 of the openings are so designed that only one button 27 may be depressed at any one time. In other words the sliders 23 serve as a mechanical interlock to ensure that only one button of a switch may be depressed at a time.

Turning now to a consideration of the wiring diagram of FIGURE 5, each surface heating element 12 is provided with two heating coils 37 and 38. The 120-volt A.C. current is fed to the primary of a voltage reducing transformer (not shown) which supplies two 60-volt circuits by means of a three wire system identified as N, L1 and L2 so that conventional multiple pushbutton switches may be used with the present invention. Most of the preceding switch structure is of the design described in the aforementioned Andrews patent and has been discussed herein detail merely as background material for understanding the present invention that is now to be discussed.

All of the switches 15 are mounted in tandem on an elongated mounting plate 42 as is best seen in FIGURES 2 and 3. Each switch housing 22 is normally provided with lug members 43 at each end thereof for receiving fastening screws that mount the switch to a supporting plate (not shown). These lugs are mounted in the opposite corners of the switch housing so that when the switches are ganged together in tandem the mounting lug 43 of one switch base is adjacent the mounting lug of the adjacent switch so that two fastening screws 44 are used between two adjacent switches. The mounting plate 52 is notched out as at 45 so that the pushrods 28 and coil springs 36 may extend freely therethrough. Looking at FIGURES 3 and 4 it is clear that the pushrods 28 are of thin sheet metal material and arranged parallel to each other transversely of the switch housing 22.

A narrow slot 46 (FIGURE 4) is arranged in the mounting plate 42 adjacent each pushrod so that the slots extend in a single row longitudinally of the plate 42. Straddling this long line of slots 46 are a group of interconnected slides 47 which constitute toothed bars for purposes which will be described hereinafter. Looking at FIGURE 3 the interconnected slides 47 are made up of bar 48 that is related to switch 20 and a double length common bar 49 that cooperates with both switches 20 and 21. Switch 21 also has a second double length bar 50 that is similar to bar 49. Bar 50 does not cooperate with switch 20 but instead with switch 21 and the intermediate switch that would be located on the left side of switch 21 in FIGURE 3. In other words, if there are four switches arranged in tandem, each of the two-end switches is provided with a bar 48, each end switch and the next adjacent inner switch with one bar 49 and the two intermediate switches with a bar 50. Small clip members 51 overlie the sliding bars 48, 49 and 50 and are fastened to the mounting plate 42 to hold the bars together. Also the end bars 48 are fastened in place by an adjustable screw 52 as is seen at the right side of FIGURES 3 and 4.

Each of the bars 48, 49 and 50 of the interconnected slides 47 are provided with inwardly directed teeth or spacers 53 which hold the bars separated and provide slots 54 of adjustable length that overlie the previously mentioned slots 46 in the mounting plate 42. These slots 54 are adjustable lengthwise by plungers 55 that are pivotally connected by screw means 60 (FIGURE 2) to certain ones of the pushbuttons 27 of the switches 15. A clear understanding of the pivoted plungers 55 may be had by studying their configuration in FIGURE 5. Notice that switch 20 has four plungers 55, while switch 21 has only three. The width of each plunger 55 is determined by the wattage of the circuit controlled by the depression of the pushbutton carrying that particular plunger. For instance, the higher the wattage the wider the plunger.

It is desirable to pivot the upper ends of the plungers 55 to the pushbuttons 27 or provide a sliding connection between these parts because the plungers do not move in a true vertical direction as do the pushbuttons, as viewed in FIGURES 2 and 5. The sliding bars are spread apart or extended when a pushbutton carrying a plunger is depressed and the plunger enlarges the adjustable slots 54. The amount of the sliding action of the bars 47 varies as a function of the width of the plungers already inserted through the bars. Some of the plungers 55 are angled away from a vertical axis by as much as 15° when they are forced through the bars 47, which of course changes the effective width of the plunger as the plunger moves down through the bars. Because of this angularity and the tolerance build-up in the interlock system no attempt is made to control any wattage less than about 133 watts in the particular embodiment of the invention illustrated. Hence the pushbuttons 27 that do not carry plungers 55 control a wattage less than about 133 watts. Then the width of each plunger 55 is slightly increased to make up for the lack of plungers on some of the pushbuttons. Also to simplify the control problem in this specific embodiment the larger heating elements are made even multiples of the small units. For example, the larger units might have a wattage of 2000, 1000, 500, 250 or 125. The two other surface units could have wattages of 1000, 500, 250, 125 and 63. Looking again at FIGURE 5 the left hand pushbutton of each switch is the Off button, while switch 20 controls the larger heating element with the 2000 watt load which is identified by plunger 56 at the right side of FIGURE 5. The pushbutton next to the Off button of switch 20 has no plunger. Its wattage is 125 watts. In switch 21 the pushbutton that is the third from the left end controls 125 watts while the button that is second from the end controls 63 watts. Notice that neither one of these pushbuttons include a plunger 55.

The interconnected slides are so designed that as the wattage load increases the overall length of the bars will become extended until they bear against the two fixed bars 48 at which time no additional pushbuttons having plungers may be depressed. However, there is always enough wattage available to permit the pushbuttons not carrying a plunger to be depressed without overloading the circuit. The lowermost end of each plunger has a guiding portion 57 which is always positioned between the interconnected slides 47 and protrudes into the slots 46 of the mounting plate 42. This is necessary so that the plungers are properly guided and do not become disengaged from the mounting plate. Each plunger 55 has a tapered or sensor portion 58 joining the guide 57 with the wide blade portion so that the plunger is capable of spreading the bars apart as the plunger is inserted through the bars. This tapered portion 58 of each plunger is desirable to provide a sensing function. The plunger is capable of being depressed to an intermediate point where the tapered sensor 58 can determine whether the plunger can be moved all of the way before any switching of the contacts is performed. A fixed angle of inclination or taper of about 45° is held for the tapered portion 58 of all plungers to ensure freedom from jamming especially with the narrower plungers.

By way of illustration, the depression of the right hand button 65 of FIGURE 5 moves the pin 29 down against the inclined surfaces 31 of the three topmost sliders 23 thereby shifting these sliders to the right while the fourth slider at the bottom remains stationary. This slider movement allows the left end contacts 25, 26 and the two right end contacts to close as at 66, 67 and 68 respectively. This places the two heating coils 37 and 38 in parallel across the high voltage lines $L_1$ and $L_2$ and draws 2000 watts as previously mentioned.

Moreover, the depression of the button 65 also carries the plunger 56 through the adjustable slot 54 of the interconnected slides 47, thereby widening the slot by shifting the slide 49 to the left with relation to the fixed slide 48. If later the circuit controlled by switch 20 is changed by depressing another button, the button 65 and its plunger 55 will automatically rise due to the interlocking action of the sliders 23 since no two buttons can be depressed at the same time. This is an inherent characteristic of this type of multiple pushbutton switch.

Later, if other circuits are switched onto the load by operating any one of the three remaining switches, such as switch 21, the same operation takes place. Three of the buttons 27 of switch 21 carry plungers 55. If one of these three buttons is depressed, the plunger 55 will be forced through the adjustable slot 54 to vary the width of the slot. In all probability the slide 49 will remain stationary, if it is bearing against the edge of one of the depressed plungers 55 of switch 20, and the slide 50 will shift to the left. If one of the plungers 55 of switch 20 is not depressed, the slide 49 will shift to the right until it engages the fixed slide 48. Accordingly, it should be appreciated that as the electrical load in the circuit increases the interconnected slides 47 are extended by the introduction of the plungers 55 into the adjustable slots 54 of the slides. The two endmost slides 48 are fixed and constitute stop means or limit means to limit the movement of the slides thereby limiting the maximum number of high wattage settings that may be made. The intermediate slides 49, 49 and 50 are free-floating but restrained by the two fixed endmost slides 48, 48. A modification would be to reverse the action of the slides so that they contract rather than expand as electrical load is added to the circuit.

Having described above our invention of a mechanical interlock system that is usable with a plurality of multiple switches and especially pushbutton switches for controlling the maximum wattage load carried by a 120-volt electric range, it will be readily apparent to those skilled in this art that this same principle may be used when the bars do not extend for the double length of the switches but instead each bar of each switch is of single length and butts against the related bar of the adjacent switch since the force applied is always a pushing force rather than a pulling force. As to a design with only two switches, only one movable slide need be utilized. Also it would be a simple matter to rearrange the positions of the switches back-to-back so that they are no longer in tandem but are arranged in the four corners of a rectangle. In this modification it would be important to have interconnected bars that extend between each two adjacent switches while the endmost bars are fixed as is described above. While I have chosen to disclose this invention as comprising a plurality of pushbutton switches fastened to a mounting plate it would be a simple matter to mold the switch housing as one piece and support the interconnected slides from the housing rather than from the mounting plate.

The plungers 55 have been shown as pivoted to the pushbuttons 27 but the pivot 60 could be replaced by a sliding connection which would allow the plungers to shift with the lateral movement of the slides 47 thereby eliminating the pivotal movement of the plungers. Also the slides 47 could be mounted one on top of the other instead of side-by-side as shown on the drawings. One important advantage of this invention is that the Off button need not be depressed before a lower wattage can be switched into the circuit. This allows for freedom in selecting the desired wattage without lost motion. Moreover, this invention is not limited to multiple pushbutton switches but may be used with rotary switches where each switch will have a rotary cam that actuates a plunger that has a tapered cross-section of gradually increasing width for spreading the slides 47 apart as additional wattage is added to the electrical load.

Modifications of this invention will occur to those skilled in this art and it is to be understood, therefore, that this invention is not limited to the particular embodiments disclosed but that it is intended to cover all modifications which are within the true spirit and scope of this invention as claimed.

What we claim as new and desire to secure by Letters Patent of the United States is:

1. A mechanical interlock system connecting a series of multiple pushbutton switches where each switch of the series controls a separate electrical load, each said switch including an Off position and a series of different circuit controlling positions for obtaining a plurality of different wattages, the mechanical interlock system serving to limit the total wattage drawn, said interlock system including a group of interconnected slides, and certain ones of the pushbuttons each carrying a plunger that cooperates with the related slides of the interlock system so that as each of said certain buttons is depressed the plunger carried thereby protrudes through the slides and tends to shift them apart and increase their overall length, and stop means for limiting the expansion of the slides, whereby only a limited number of plungers can be inserted through the slides, and only a limited number of buttons may be depressed at any one time before the interlock system prevents the further increase of wattage consumption controlled by said switches.

2. A mechanical interlock system connecting a plurality of multiple pushbutton switches, a plurality of electric heater elements, each switch controlling separate electric heater element and being capable of changing the circuit arrangement of the controlled heater element to vary the wattage supplied thereto, the interlock system including an accumulator device in the form of extensible slides interconnecting all of the switches whereby increases in wattage drawn by each switch upon the depression of a pushbutton is registered by the extension of the accumulator until a maximum wattage is drawn, after which the system restricts the addition of any more wattage load by restricting further extension of the accumulator.

3. A mechanical interlock system connecting a series of multiple pushbutton switches, a plurality of electric heater elements controlled by said switches, each said switch including an Off position and a series of different circuit controlling positions for obtaining a plurality of different wattages, the mechanical interlock system serving to limit the total wattage drawn for the various heater elements, said interlock system including a group of interconnected slides, at least some of the pushbuttons including a plunger cooperating with the related slides of the interlocking system to protrude through them so as each button is depressed the plunger carried thereby tends to shift them apart, stop means for limiting the expansion of the slides, and said plungers and slides related to each other so that when the expansion of said slides is thus limited the operation of certain others of said pushbuttons is prevented thereby to limit the wattage consumption controlled by said switches.

4. In an electric range that is wired with a 120-volt service, the range having a cooktop with a plurality of surface heating elements and an oven with both a bake and a broil unit arranged in the bottom and top of the oven respectively, a series of multiple pushbutton switches, one for controlling each surface heating element and one for controlling both the bake and broil oven units, each switch including an Off position and a series of different circuit controlling positions for obtaining a plurality of wattages, a mechanical interlock system joining the pushbutton switches to limit the total wattage drawn for the various heater elements, said interlock system including a group of interconnected slides defining a series of spaced slots between them, at least some of the pushbuttons of the switches including a plunger cooperating with the related slides of the interlock system, so as each plunger is depressed by depressing the related pushbuttons the plunger protrudes through one of said slots and tends to shift said slides apart, and stop means for limiting the expansion of the slides relative to each other, whereby only a limited number of plungers can be inserted through the slides and only a limited number of buttons may be depressed.

5. An electric range as recited in claim 4 wherein the series of multiple pushbutton switches are mounted on an elongated plate, each pushbutton switch including a housing having a plurality of pushrods extending through one wall thereof, the outermost end of each pushrod including a button for manual actuation of the switch, the housings of the pushbutton switches being arranged on one side of the elongated plate while the pushrods extend through the plate with the pushbuttons arranged on the opposite side, the group of interconnected slides being supported on the side of the elongated plate nearest the pushbuttons, the said plungers that are supported from some of the pushbuttons being pivotally mounted on the button for slight angular movement as the slides begin to move, each plunger having a narrow tip which is always disposed between the slides so as to be held therein, the width of each plunger being chosen to represent a value that is comparable to the wattage of the circuit that is governed by the depression of the related pushbutton so that there is a predetermined relationship between the wattage of the circuit to be controlled and the width of the plunger.

6. An electric range as recited in claim 5 wherein the group of interconnected slides of the interlock system is made up of toothed bars that are arranged side-by-side to slide on the elongated plate that supports the switches, where the teeth of each bar extend toward the teeth of the related bar, each bar being of a length equal to approximately the spacing of two adjacent switches, while each end switch has a short bar of one switch length and a long bar of two switch lengths for cooperation with the adjacent switch, said adjacent switch also having a toothed bar that extends from it to the third switch, said teeth of said bars defining said spaced slots.

7. An electric range having a plurality of surface heating elements each with at least one heating element and a single oven, a plurality of multiple pushbutton switches grouped together for controlling the electrical circuits for energizing the various heating elements, a mechanical interlock system for the switches to limit the total current drawn by the heating elements, said interlock system comprising an accumulator which is actuated by the depression of at least some of the pushbuttons, there being a predetermined relation between the particular wattage of the circuit controlled by a given button and the registration of that button by the accumulator so that a fixed maximum wattage may not be exceeded.

8. An electric range as recited in claim 7 wherein the accumulator comprises a series of cooperating slides, while some of the pushbuttons carry pivoted plungers that act upon the slides and tend to extend them as the respective buttons are depressed, there being stop means to restrict the extension of the slides to a given amount so as to fix the maximum current load that may be drawn by the range.

9. An electric range as recited in claim 8 wherein each plunger has a guiding and sensing tip portion so that the buttons may be depressed slightly to test the availability of the necessary amount of wattage without operating the electrical contacts of the various switches.

10. An electric range as recited in claim 9 wherein each pushbutton is provided with spring means normally biasing the button to its outermost position.

11. An electric range comprising a plurality of surface heating elements and at least one oven heating element, a plurality of multiple pushbutton switches controlling the energization of the various heating elements, and a mechanical interlock system between the switches to limit the maximum wattage drawn by the heating elements so the range may be operated from a 120-volt service, said interlock system comprising a series of slides which are shifted so that the wattage is a direct function of this movement as the wattage load is increased, and stop means for limiting the movement of the slides thereby limiting in effect the wattage drawn by the range.

12. A plurality of electrical load elements and a plurality of multiple switches for controlling the energization of the elements, an interlock system connecting all of the switches to limit the maximum wattage drawn by the elements at any one time, said interlock system comprising a series of slides which push against each other as the pushbuttons are depressed to increase the wattage drawn from said power supply, stop means for limiting the movement of said slides, and said slides when their movement is thus restricted coacting with certain of the remaining said pushbuttons corresponding to the higher wattage loads of the controlled elements to prevent their operation, thereby limiting the maximum number of high wattage settings that may be made.

13. A mechanical interlock system connecting a series of multiple pushbutton switches where each switch of the series controls a separate electrical load, each of said switches including an Off position and a series of different circuit controlling positions for obtaining a plurality of different wattages, the mechanical interlock system serving to limit the total wattage drawn, said interlock system including a slide, connection means between predetermined ones of said pushbuttons and said slide for shifting said slide in a predetermined direction a distance dependent upon the wattage controlled by said pushbuttons respectively, stop means for limiting the movement of said slide in said direction to a position corresponding to the operation of a number of preselected ones of said pushbuttons, and said connection means preventing the operation of certain other ones of said pushbuttons when said slide is in said position.

14. A mechanical interlock system connecting a series of multiple pushbutton switches where each switch of the series controls a separate electrical load, each said switches including an Off position and a series of different circuit controlling arrangement positions for obtaining a plurality of different wattages, the mechanical interlock systems serving to limit the total wattage drawn, said interlock system including a group of interconnected slides defining between them a series of aligned slots, and at least each of certain ones of said pushbuttons having associated therewithin a plunger operable in a corresponding one of said slots to shift the relative position of said slides when the pushbutton is depressed thereby varying the effective widths of all of said slots, and stop means for limiting the relative movement permitted between said slides so that when said pushbuttons corresponding to a predetermined maximum controlled load have been depressed, said effective widths are reduced to prevent the further depression of selected others of said pushbuttons.

References Cited in the file of this patent

UNITED STATES PATENTS

| | | |
|---|---|---|
| 2,431,904 | Andrews | Dec. 2, 1947 |
| 2,526,234 | Huck | Oct. 17, 1950 |
| 2,725,451 | Huck et al. | Nov. 29, 1955 |
| 2,793,257 | Hutt | May 21, 1957 |